United States Patent [19]

Imori et al.

[11] Patent Number: 4,686,399

[45] Date of Patent: Aug. 11, 1987

[54] ROTOR FOR ROTARY ELECTRICAL MACHINES

[75] Inventors: Hideo Imori; Toshiyuki Takahara, both of Hyogo, Japan

[73] Assignee: Mitsubishi Denki Kabushiki Kaisha, Tokyo, Japan

[21] Appl. No.: 663,922

[22] Filed: Oct. 23, 1984

[30] Foreign Application Priority Data

Oct. 25, 1983 [JP] Japan .................... 58-166314[U]

[51] Int. Cl.⁴ ............................................. H02K 9/06
[52] U.S. Cl. ...................................... 310/62; 310/42; 310/63; 310/263; 417/423 R
[58] Field of Search ............... 310/263, 62, 64, 63, 310/42, 58, 59; 416/213 R, 237; 417/423 R; 98/72, 75; 29/156.8 CF, 598

[56] References Cited

U.S. PATENT DOCUMENTS

| 3,431,978 | 3/1969 | Papst | 310/213 A |
| 4,418,295 | 11/1983 | Shiga | 310/263 |
| 4,451,749 | 5/1984 | Kanayama | 310/62 |
| 4,488,070 | 12/1984 | Iwaki et al. | 310/62 |
| 4,492,885 | 1/1985 | Kitamura | 310/62 |
| 4,565,936 | 1/1986 | Ikegami | 310/62 |

FOREIGN PATENT DOCUMENTS 1188749 12/1957 France ..................... 310/263

Primary Examiner—R. J. Skudy
Attorney, Agent, or Firm—Sughrue, Mion, Zinn, Macpeak & Seas

[57] ABSTRACT

A rotary electrical machine is disclosed in which a cylindrical portion is provided at the outer surface of at least one of a pair of claw-shaped poles, and a cooling blade is positioned and fitted to the cylindrical portion through an opening formed in the cooling blade, concentrically with respect to the cylindrical portion, and fixed to the claw-shaped pole by caulking and welding.

7 Claims, 5 Drawing Figures

ROTOR FOR ROTARY ELECTRICAL MACHINES

BACKGROUND OF THE INVENTION

The present invention relates to a rotor of a rotary electrical machine such as a charging generator intended for vehicular use. More particularly, the invention relates to an improvement in the way in which cooling blades, making up a rotor, are fixed to the rotor.

In a rotor of a charging generator for vehicles, cooling blades are provided for radiating heat produced in the field coil of the generator and for thereby cooling the rotor. FIG. 1 shows a conventional rotor provided with cooling blades. In FIG. 1, a rotor 1 is constituted by a rotary shaft 2, a pair of claw-shaped poles 3a and 3b, a field coil 4, a slip ring 5, and cooling blades 6a and 6b. The field coil 4 is disposed around the rotary shaft 2 and the pair of claw-shaped poles 3a and 3b are arranged such that they can axially sandwich the field coil 4 therebetween. The slip ring 5 is fitted on the rotary shaft 2 at the side end portion thereof. The cooling blades 6a and 6b are fixedly attached to the respective ones of the claw-shaped poles 3a and 3b at a plurality of points 6c at their outer side surfaces by resistance welding.

In the thus-arranged conventional rotor, the positions of the blades 6a and 6b with respect to the shaft 2 is not closely controlled, and therefore sometimes the blades 6a and 6b may be eccentrically fixed to the shaft 2, resulting in an unbalance or the like during rotation. In this case, there is some risk that the blades will fly off the rotor due to breaking of the resistance welds. For this reason, it is necessary to very carefully inspect all welding points during manufacture, and thus there is a disadvantage that the manufacturing efficiency of the rotor is low.

SUMMARY OF THE INVENTION

An object of the present invention is therefore to provide a rotor for a rotary electrical machine which will always rotate in a properly balanced state and in which there is no danger that the cooling blades will fly off, even if a resistance weld breaks.

Another object of the present invention is to provide a rotor for a rotary electrical machine in which cooling blades can be readily but firmly fixed to claw-shaped poles.

A further object of the present invention is to provide a rotor for a rotary electrical machine in which it is not necessary to inspect each welding point between the cooling blades and the poles.

In order to attain the above objects, according to the present invention, cylindrical portions are provided concentrically with the rotary shaft at the respective outer surfaces of a pair of claw-shaped poles, cooling blades are positioned and fitted, by caulking, to the cylindrical portions through circular central openings formed in the blades concentrically with the cylindrical portions and fixed to the claw-shaped poles by welding or the like.

The above and other objects and features of the present invention will become apparent from the following description read in conjunction with the accompanying drawings.

DESCRIPTION OF THE PREFERRED EMBODIMENTS

Figure 1:
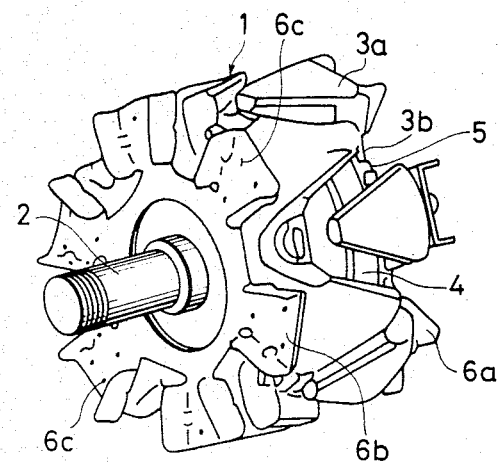
FIG. 1 is a perspective view of a conventional rotor.

Referring to FIGS. 2 through 5, a preferred embodiment of the present invention will be described hereunder. In the drawings, the same parts as seen in FIG. 1 are designated by the same reference numerals as used in FIG. 1.

Figure 2:
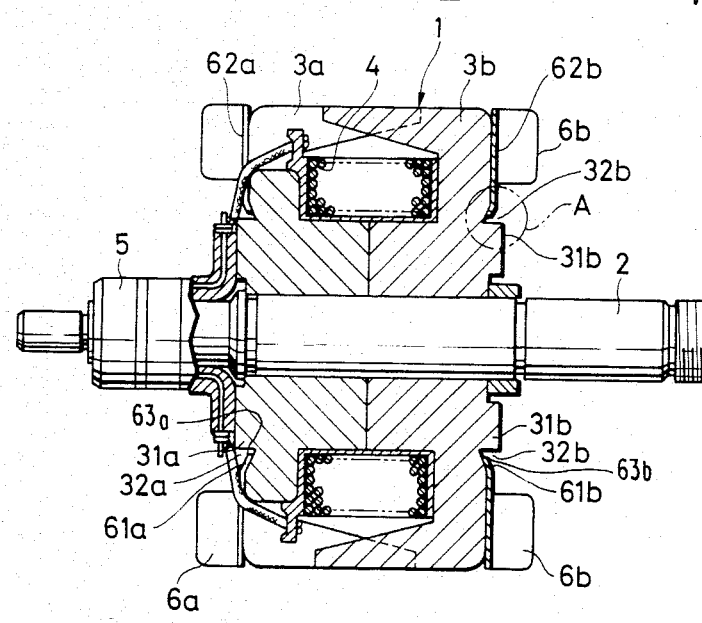
FIG. 2 is a side view, partly in cross section, showing a rotor constructed according to the present invention in which cooling blades are fitted to the respective cylindrical portions of claw-shaped poles.
Figure 3:
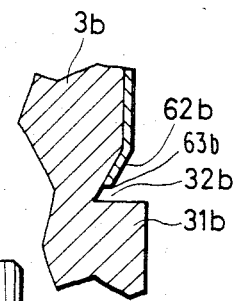
FIG. 3 is an enlarged partial cross section of a portion A in FIG. 2.
Figure 4:
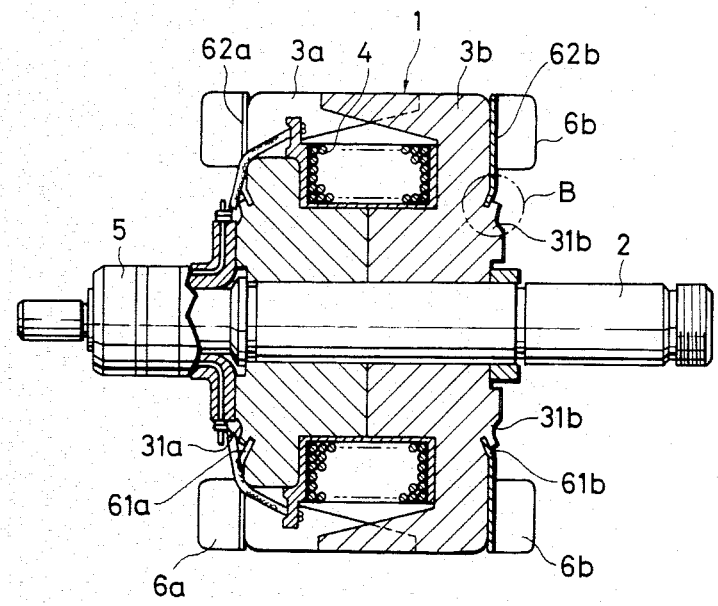
FIG. 4 is a side view, partly in cross section, showing cooling blades fixed by caulking to respective claw-shaped poles.
Figure 5:
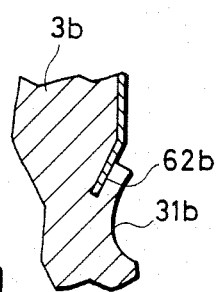
FIG. 5 is an enlarged partial cross section of a portion B in FIG. 4.

In FIGS. 2 through 5, cylindrical portions 31a and 31b are formed on the outer side surfaces of the respective forward- and backward-facing claw-shaped poles 3a and 3b, projecting outwardly therefrom and disposed concentrically with the shaft 2. V-shaped grooves 32a and 32b are formed in the cylindrical portions 31a and 31b, respectively, at the base portions thereof. Each of the blades 6a and 6b is constituted by a base portion 61a, 61b which is bent and a fan portion 62a, 62b. Bent portions 61a and 61b are formed near the inner circumferential portion of the respective blades 6a and 6b surrounding the rotary shaft 2. The bent portions 61a and 61b are shaped so that they can be fitted into the respective grooves 32a and 32b. Circular central openings or hollow portions 63a, 63b are formed concentrically with the cylindrical portions 31a and 31b, respectively. The cylindrical portions 31a, 31b are fitted through the circular central openings 63a, 63b as shown in FIGS. 2 and 3. Viewed along the axis of the rotary shaft 2 in FIGS. 2 and 3, the cylindrical portions 31a, 31b extend farther along that axis than do the cooling blades 6a, 6b in the vicinity of the circular central openings 63a, 63b.

In this arrangement, the blades 6a and 6b are, as shown in FIGS. 2 and 3, first mounted on the cylindrical portions 31a and 31b with the bent portions 61a and 61b fitted into the grooves 32a and 32b, respectively. And then the blades 6a and 6b are respectively fixed to the claw-shaped poles 3a and 3b by caulking the cylindrical portions 31a and 31b. Because the blades 6a and 6b are concentric with respect to the respective cylindrical portions 31a and 31b disposed concentrically with the rotary shaft 2, the blades 6a and 6b are fixed to the rotary shaft 2 without the danger of their being eccentric with respect to the rotary shaft 2. Thus, any possibility of unbalance as sometimes occurred in the conventional rotor is eliminated.

Further, middle portions 62a and 62b of the respective blades 6a and 6b are fixed to the claw-shaped poles 3a and 3b by resistance welding, similarly to the conventional case. Thus, double fixing is effected in that first of all the respective blades 6a and 6b are fixed to the poles 3a and 3b, respectively, by resistance welding. Secondly, the bent portions 61a and 61b of the blades 6a and 6b are fixed to the poles 3a and 3b, respectively, by caulking through the circular central openings 63a, 63b of the blades 6a and 6b onto the outer peripheral portions of the respective cylindrical portions 31a and 31b. Thus there is an advantage that there is no risk of the blades flying off, even if there are voids in the welded portions 62a and 62b. Therefore it is not necessary to inspect the welding points one by one. Further, since a toroidally shaped field coil 4 is arranged around the rotary shaft 2, the outer diameter of the rotor 1 can be reduced and the rotor 1 can always rotate in a properly balanced state.

We claim:

1. A rotor of a rotary electrical machine, comprising:
   (a) a field coil arranged around a rotary shaft;
   (b) a pair of claw-shaped poles arranged to sandwich said field coil from axially opposite sides thereof having a plurality of cylindrical portions formed at outer side surfaces projecting outwardly from respective said outer side surfaces, said cylindrical portions being arranged concentrically with respect to said rotary shaft; and
   (c) cooling blades each having a circular central opening through which said cylindrical portions fit when said cooling blades are positioned thereon, said cooling blades being fixed to said respective cylindrical portions by caulking through said circular central openings, said blades being further fixed to respective ones of said respective claw-shaped poles by welding.

2. The rotor of a rotary electrical machine according to claim 1, in which a V-shaped groove is formed at a base portion of each of said cylindrical portions, and a bent portion of each of said cooling blades shaped to be fitted in said groove is formed at an inner circumferential portion of each of said blades.

3. The rotor of a rotary electrical machine according to claim 1, in which said cooling blades are respectively fixed to said pair of claw-shaped poles by caulking an outer peripheral portion of each of said cylindrical portions.

4. The rotor of a rotary electrical machine according to claim 1, in which said field coil is toroidally shaped and arranged symmetrically about said rotary shaft.

5. The rotor of a rotary electrical machine according to claim 1, in which said cooling blades are fixedly attached to both poles of said pair of claw-shaped poles.

6. A rotor of a rotary electrical machine, comprising:
   (a) a field coil arranged around a rotary shaft;
   (b) a pair of claw-shaped poles arranged axially along said rotary shaft on either side of said field coil, each of said poles having an outer side surface facing axially away from said coil and having a cylindrical portion formed thereon, each of said cylindrical portions being arranged concentrically with respect to said rotary shaft and having a base portion adjacent to said outer side surface; and
   (c) cooling blades secured to said outer side surfaces, said cylindrical portions extending axially beyond at least a portion of said blades.

7. The rotor of a rotary electrical machine according to claim 6, in which a V-shaped groove is formed at said base portion of each of said cylindrical portions each of said cooling blades having a bent portion formed at an inner circumferential portion thereof and fitted in a respective one of said grooves.

* * * * *